United States

Göbl

4,217,033

Aug. 12, 1980

[54] CAMERA OBJECTIVE OF VARIABLE FOCAL LENGTH

[75] Inventor: Irmgard Göbl, Kitzbühel, Austria

[73] Assignees: Karl Vockenhuber; Raimund Hauser, both of Vienna, Austria

[21] Appl. No.: 918,399

[22] Filed: Jun. 23, 1978

[30] Foreign Application Priority Data

Jun. 30, 1977 [AT] Austria .................................. 4653/77

[51] Int. Cl.$^2$ ............................................. G02B 15/18
[52] U.S. Cl. ................................................... 350/184
[58] Field of Search .................................. 350/184, 186

[56] References Cited

U.S. PATENT DOCUMENTS 4,087,160  5/1978  Besenmatter ........................ 350/184

*Primary Examiner*—Conrad J. Clark
*Attorney, Agent, or Firm*—Montague & Ross

[57] ABSTRACT

A pancratic camera objective of varifocal ratio close to 5:1, and with a relative aperture varying between 1:1.2 in a wide-angle position and 1:1.5 in a telephoto position, has a pair of axially shiftable negative components bracketed by a pair of substantially fixed positive components. Its negative third component is more widely separated from its positive fourth component in the wide-angle position than in the telephoto position.

2 Claims, 1 Drawing Figure

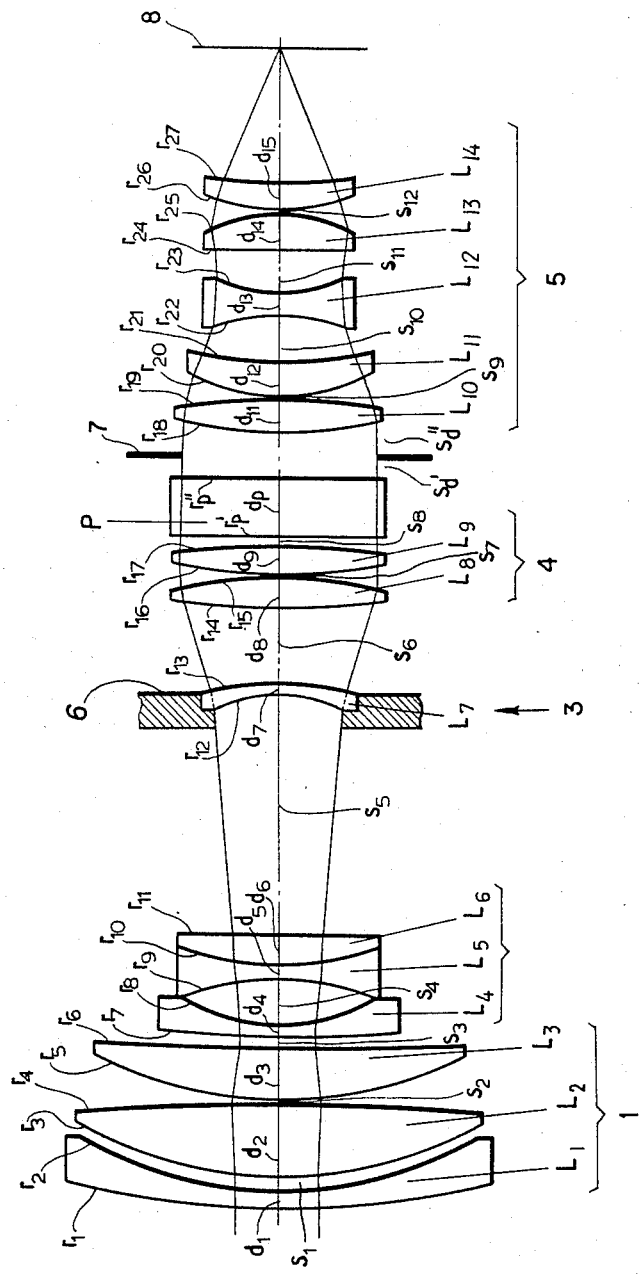

CAMERA OBJECTIVE OF VARIABLE FOCAL LENGTH

FIELD OF THE INVENTION

My present invention relates to a pancratic camera objective of the general type described in commonly owned U.S. Pat. No. 4,087,160, including a varifocal forward lens group and a fixed-focus rear lens group centered on a common optical axis, the forward lens group consisting of a substantially axially fixed positive first component, axially shiftable negative second and third components, and an axially fixed fourth component. The first three components form a lens assembly of dispersive character; the third component approaches the fourth component more closely in a telephoto position of maximum overall focal length $f_{max}$ than in a wide-angle position of minimum focal length $f_{min}$ while having an inversion point at an intermediate position of overall focal length $f_{med}$.

BACKGROUND OF THE INVENTION

The prior patent referred to above discloses two specific embodiments, one of them with a varifocal ratio $f_{max}/f_{min}$ approximately equal to 8, the other with a varifocal ratio of about 10. In the wide-angle position of the objective, its relative aperture is 1:1.2 according to the first embodiment and 1:1.8 according to the second one; the first system, accordingly, falls in the so-called XL (=existing light) class permitting—in a cinematographic camera—the taking of indoor motion pictures without additional illumination. The effective area of the third (negative) component of an objective as described in that patent is restricted to provide full illumination of the fourth (positive) component by axially incident light rays in the wide-angle position but less than full illumination in the telephoto position, thereby enabling a reduction in the lens diameters of the front component.

OBJECT OF THE INVENTION

The object of my present invention is to provide an objective of the general type described above which is of simpler construction, does not necessarily require a restriction of the effective area of the third component and has a relative aperture similar to that of the first embodiment disclosed in the prior patent, i.e. about 1:1.2 in the wide-angle position, while still affording a large varifocal ratio of approximately 5:1.

SUMMARY OF THE INVENTION

I realize this object, pursuant to my present invention, with a pancratic objective of only seven lens members (one of them a doublet) in its varifocal forward group, i.e. with a first component consisting of three singlets, having parameters substantially as given hereinafter.

BRIEF DESCRIPTION OF THE DRAWING

My invention will now be described in detail with reference to the accompanying drawing the sole FIGURE of which diagrammatically illustrates my improved pancratic objective.

SPECIFIC DESCRIPTION

In the drawing I have shown the wide-angle position of a pancratic objective according to my invention, including a varifocal forward lens group with components 1–4 and a rear lens group 5. The substantially stationary positive component 1 (which may be limitedly shiftable for focusing purposes) comprises a front lens in the form of a negative meniscus $L_1$ with radii $r_1$, $r_2$ and thickness $d_1$, two positive lenses $L_2$ (radii $r_3$, $r_4$ and thickness $d_2$) and $L_3$ (radii $r_5$, $r_6$ and thickness $d_3$) which intervening air spaces $s_1$ and $s_2$. A variable air space $s_3$ separates lens $L_3$ from the axially shiftable component 2 consisting of a singlet $L_4$ in the form of a negative meniscus (radii $r_7$, $r_8$ and thickness $d_4$) separated by an air space $s_4$ from a doublet consisting of lenses $L_5$ (radii $r_9$, $r_{10}$ and thickness $d_5$) and $L_6$ (radii $r_{10}$, $r_{11}$ and thickness $d_6$). Another variable air space $s_5$ lies between component 2 and component 3 which consists of a single lens $L_7$ in the form of a negative meniscus with radii $r_{12}$, $r_{13}$ and thickness $d_7$. A third variable air space $s_6$ lies between component 3 and axially fixed component 4 which in this instance consists of two air-spaced biconvex lenses $L_8$ (radii $r_{14}$, $r_{15}$ and thickness $d_8$) and $L_9$ (radii $r_{16}$, $r_{17}$ and thickness $d_9$), the intervening air space having been designated $s_7$. The light path between components 3 and 4 is restricted by a mounting 6 for lens $L_7$, acting as an ancillary diaphragm.

A reflex prism P of thickness $d_p$, whose planar faces have been designated $r_p'$ and $r_p''$, is separated by an air space $s_8$ from lens $L_9$ and by a diaphragm space $s_d' + s_d''$ from component 5, the latter space containing an iris diaphragm 7. Component 5 consists of five air-spaced singlets, namely a biconvex lens $L_{10}$ (radii $r_{18}$, $r_{19}$ and thickness $d_{10}$), a positive meniscus $L_{11}$ (radii $r_{20}$, $r_{21}$ and thickness $d_{11}$), a biconcave lens $L_{12}$ (radii $r_{22}$, $r_{23}$ and thickness $d_{12}$), a planoconvex lens $L_{13}$ (radii $r_{24}$, $r_{25}$ and thickness $d_{13}$) and another positive meniscus $L_{14}$ (radii $r_{26}$, $r_{27}$ and thickness $d_{14}$); the intervening air spaces have been designated $s_9$, $s_{10}$, $s_{11}$ and $s_{12}$. The image plane of the objective has been shown at 8.

In the following table I have given representative numerical values for the parameters $r_1$–$r_{27}$, $d_1$–$d_{14}$ and $s_1$–$s_{12}$ of the illustrated optical system, based upon a mean overall focal length $f_{med}=1$ in the extreme left-hand position of component 3. The table also gives the refractive indices $n_d$ and the Abbé numbers $\nu_d$ of the various lenses.

| Lens | Radii | Thicknesses and Separations | $n_d$ | $\nu_d$ |
|---|---|---|---|---|
| $L_1$ | $r_1 = +6.626$ | $d_1 = 0.139$ | 1.805 | 25.4 |
|  | $r_2 = +2.734$ |  |  |  |
|  |  | $s_1 = 0.077$ |  |  |
| $L_2$ | $r_3 = +2.734$ | $d_2 = 0.499$ | 1.620 | 60.3 |
|  | $r_4 = -21.705$ |  |  |  |
|  |  | $s_2 = 0.008$ |  |  |
| $L_3$ | $r_5 = +2.806$ | $d_3 = 0.333$ | 1.667 | 48.4 |
|  | $r_6 = +18.186$ |  |  |  |
|  |  | $s_3 = \begin{cases} 0.063\ f_{min} \\ 0.635\ f_{med} \\ 1.635\ f_{max} \end{cases}$ |  |  |
| $L_4$ | $r_7 = +6.973$ | $d_4 = 0.077$ | 1.713 | 53.8 |
|  | $r_8 = +1.143$ |  |  |  |
|  |  | $s_4 = 0.317$ |  |  |
| $L_5$ | $r_9 = -1.817$ | $d_5 = 0.077$ | 1.620 | 60.3 |
|  | $r_{10} = +1.817$ |  |  |  |
| $L_6$ |  | $d_6 = 0.213$ | 1.805 | 25.4 |
|  | $r_{11} = \infty$ |  |  |  |
|  |  | $s_5 = \begin{cases} 1.529\ f_{min} \\ 0.929\ f_{med} \\ 0.278\ f_{max} \end{cases}$ |  |  |
|  | $r_{12} = -1.237$ |  |  |  |

-continued

| Lens | Radii | Thicknesses and Separations | $n_d$ | $v_d$ |
|---|---|---|---|---|
| $L_7$ | $r_{13} = -4.629$ | $d_7 = 0.077$ | 1.744 | 44.8 |
| | | $s_6 = \begin{cases} 0.501\ f_{min} \\ 0.529\ f_{med} \\ 0.180\ f_{max} \end{cases}$ | | |
| $L_8$ | $r_{14} = +6.802$ | $d_8 = 0.213$ | 1.620 | 60.3 |
| | $r_{15} = -2.883$ | $s_7 = 0.008$ | | |
| $L_9$ | $r_{16} = +4.703$ | $d_9 = 0.170$ | 1.620 | 60.3 |
| | $r_{17} = -7.120$ | $s_8 = 0.077$ | | |
| P | $r_p' = \infty$ | $d_p = 0.387$ | 1.517 | 64.2 |
| | $r_p'' = \infty$ | $s_d' + s_d'' = 0.116 + 0.139$ | | |
| $L_{10}$ | $r_{18} = +2.294$ | $d_{10} = 0.224$ | 1.620 | 60.3 |
| | $r_{19} = -7.306$ | $s_9 = 0.008$ | | |
| $L_{11}$ | $r_{20} = +1.225$ | $d_{11} = 0.221$ | 1.620 | 60.3 |
| | $r_{21} = +2.660$ | $s_{10} = 0.310$ | | |
| $L_{12}$ | $r_{22} = +1.290$ | $d_{12} = 0.166$ | 1.847 | 23.8 |
| | $r_{23} = +1.290$ | $s_{11} = 0.252$ | | |
| $L_{13}$ | $r_{24} = +70.722$ | $d_{13} = 0.255$ | 1.713 | 53.8 |
| | $r_{25} = -0.947$ | $s_{12} = 0.008$ | | |
| $L_{14}$ | $r_{26} = +1.137$ | $d_{14} = 0.174$ | 1.620 | 60.3 |
| | $r_{27} = +4.420$ | | | |

The objective conforming to the foregoing table has a minimum focal length $f_{min} = 0.666$, a median focal length $f_{med} = 1$ and a maximum focal length $f_{max} = 2.863$. Its relative aperture is 1:1.2 in the illustrated wide-angle position and 1:1.5 in the telephoto position at the opposite end of its varifocal range.

I claim:

1. In a camera objective of variable focal length including a varifocal foward lens group and a fixed-focus rear lens group centered on a common optical axis, said forward lens group consisting of a substantially axially fixed positive first component, an axially shiftable negative second component, an axially shiftable negative third component and an axially fixed fourth component, said second and third components being displaceable between a wide-angle position of minimum overall focal length and a telephoto position of maximum overall focal length with maintenance of an invarient image plane behind said rear lens group, said third component approaching said fourth component more closely in said telephoto position than in said wide-angle position, the combination of said first, second and third components being of dispersive character, the improvement wherein said first component consists of lenses $L_1$, $L_2$ and $L_3$, said second component consists of lenses $L_4$, $L_5$ and $L_6$, said third component consists of a lens $L_7$ and said fourth component consists of lenses $L_8$ and $L_9$, said lenses having radii of curvature $r_1$–$r_{17}$, axial thicknesses $d_1$–$d_9$ and axial spacings $s_1$–$s_7$ whose numerical values, based on a numerical value of unity for an intermediate overall focal length, together with their refractive indices $n_d$ and Abbé numbers $v_d$ are substantially as given in the following table:

| | | | $n_d$ | $v_d$ |
|---|---|---|---|---|
| $L_1$ | $r_1 = +6.6$ | $d_1 = 0.14$ | 1.81 | 25 |
| | $r_2 = +2.7$ | $s_1 = 0.08$ | | |
| $L_2$ | $r_3 = +2.7$ | $d_2 = 0.50$ | 1.62 | 60 |
| | $r_4 = -21.7$ | $s_2 = 0.01$ | | |
| $L_3$ | $r_5 = +2.8$ | $d_3 = 0.33$ | 1.67 | 48 |
| | $r_6 = +18.2$ | $s_3 = \begin{cases} 0.06\ f_{min} \\ 0.64\ f_{med} \\ 1.64\ f_{max} \end{cases}$ | | |
| $L_4$ | $r_7 = +7.0$ | $d_4 = 0.08$ | 1.71 | 54 |
| | $r_8 = +1.1$ | $s_4 = 0.32$ | | |
| $L_5$ | $r_9 = -1.8$ | $d_5 = 0.08$ | 1.62 | 60 |
| $L_6$ | $r_{10} = +1.8$ | $d_6 = 0.21$ | 1.81 | 25 |
| | $r_{11} = \infty$ | $s_5 = \begin{cases} 1.53\ f_{min} \\ 0.93\ f_{med} \\ 0.28\ f_{max} \end{cases}$ | | |
| $L_7$ | $r_{12} = -1.2$ | $d_7 = 0.08$ | 1.74 | 45 |
| | $r_{13} = -4.6$ | $s_6 = \begin{cases} 0.50\ f_{min} \\ 0.53\ f_{med} \\ 0.18\ f_{max} \end{cases}$ | | |
| $L_8$ | $r_{14} = +6.8$ | $d_8 = 0.21$ | 1.62 | 60 |
| | $r_{15} = -2.9$ | $s_7 = 0.01$ | | |
| $L_9$ | $r_{16} = +4.7$ | $d_9 = 0.17$ | 1.62 | 60 |
| | $r_{17} = -7.1$ | | | |

2. The improvement defined in claim 1 wherein said rear lens group consists of lenses $L_{10}$, $L_{11}$, $L_{12}$, $L_{13}$ and $L_{14}$ whose radii of curvature $r_{18}$–$r_{27}$, axial thicknesses $d_{10}$–$d_{14}$, axial spacings $s_9$–$s_{12}$, refractive indices $n_d$ and Abbé numbers $v_d$ are substantially as given in the following table:

| | | | $n_d$ | $v_d$ |
|---|---|---|---|---|
| $L_{10}$ | $r_{18} = +2.3$ | $d_{10} = 0.22$ | 1.62 | 60 |
| | $r_{19} = -7.3$ | $s_9 = 0.01$ | | |
| $L_{11}$ | $r_{20} = +1.2$ | $d_{11} = 0.22$ | 1.60 | 60 |
| | $r_{21} = +2.7$ | $s_{10} = 0.31$ | | |
| $L_{12}$ | $r_{22} = +1.3$ | $d_{12} = 0.17$ | 1.85 | 24 |
| | $r_{23} = +1.3$ | $s_{11} = 0.25$ | | |
| $L_{13}$ | $r_{24} = +70.7$ | $d_{13} = 0.26$ | 1.71 | 54 |
| | $r_{25} = -0.9$ | $s_{12} = 0.01$ | | |
| $L_{14}$ | $r_{26} = +1.1$ | $d_{14} = 0.17$ | 1.62 | 60 |
| | $r_{27} = +4.4$ | | | |

* * * * *